(12) United States Patent
Ishibashi et al.

(10) Patent No.: US 8,355,223 B2
(45) Date of Patent: Jan. 15, 2013

(54) MAGNETIC RECORDING MEDIUM, METHOD OF MANUFACTURING MAGNETIC RECORDING MEDIUM, AND MAGNETIC RECORDING/REPRODUCING APPARATUS

(75) Inventors: Shinichi Ishibashi, Tokyo (JP); Akira Yamane, Ichihara (JP)

(73) Assignee: Showa Denko K.K., Tokyo (JP)

( * ) Notice: Subject to any disclaimer, the term of this patent is extended or adjusted under 35 U.S.C. 154(b) by 454 days.

(21) Appl. No.: 12/556,187

(22) Filed: Sep. 9, 2009

(65) Prior Publication Data

US 2010/0067141 A1 Mar. 18, 2010

(30) Foreign Application Priority Data

Sep. 12, 2008 (JP) ................................ 2008-235395

(51) Int. Cl.
*G11B 5/66* (2006.01)
*G11B 5/82* (2006.01)

(52) U.S. Cl. ....................................... 360/135; 428/829

(58) Field of Classification Search .................. 360/135; 428/828, 829
See application file for complete search history.

(56) References Cited

U.S. PATENT DOCUMENTS

| | | | |
|---|---|---|---|
| 6,579,634 B2 * | 6/2003 | Saito ........................... | 428/845.5 |
| 6,858,328 B1 | 2/2005 | Ishida et al. | |
| 7,067,207 B2 | 6/2006 | Kamata et al. | |
| 7,161,753 B2 | 1/2007 | Wachenschwanz et al. | |
| 7,403,353 B2 | 7/2008 | Tagami et al. | |
| 7,531,249 B2 * | 5/2009 | Oikawa ........................ | 428/829 |
| 7,850,441 B2 | 12/2010 | Usa et al. | |
| 8,147,995 B2 * | 4/2012 | Xi et al. ........................ | 428/828 |
| 2001/0006744 A1 * | 7/2001 | Saito ...................... | 428/694 TM |
| 2004/0258833 A1 | 12/2004 | Kamata et al. | |
| 2007/0217072 A1 * | 9/2007 | Oikawa ........................ | 360/135 |
| 2009/0180213 A1 | 7/2009 | Fukushima et al. | |

FOREIGN PATENT DOCUMENTS

| | | | |
|---|---|---|---|
| GB | 1443248 A | * | 7/1976 |
| JP | 05-205257 A | | 8/1993 |
| JP | 07210859 A | * | 8/1995 |
| JP | 11-031318 A | | 2/1999 |
| JP | 11-273070 A | | 10/1999 |
| JP | 2001-176049 A | | 6/2001 |
| JP | 2002-288813 A | | 10/2002 |
| JP | 2002-359138 A | | 12/2002 |
| JP | 2004-164692 A | | 6/2004 |

(Continued)

OTHER PUBLICATIONS

"Recording Medium With Discrete Alternate Track of Differing Coercive Force," Dec. 1977, IBM TDB, vol. 20, Iss. No. 7, p. 2820.*

(Continued)

*Primary Examiner* — Will J Klimowicz
(74) *Attorney, Agent, or Firm* — Sughrue Mion, PLLC (57) ABSTRACT

The present invention provides a magnetic recording medium that has sufficient recording/reproducing characteristics and good write characteristics and can correspond to high recording density, and a method of manufacturing the same. A magnetic recording medium 1 includes a plurality of magnetic recording patterns 2 that is magnetically separated from each other. Each of the magnetic recording patterns 2 includes a low-coercivity region 2a and a high-coercivity region 2b having a coercivity higher than the low-coercivity region, and the high-coercivity region 2b is arranged at the center of the low-coercivity region 2a in a plan view.

6 Claims, 8 Drawing Sheets

FOREIGN PATENT DOCUMENTS

| | | | |
|---|---|---|---|
| JP | 2006099842 | * | 4/2006 |
| JP | 2006-209952 A | | 8/2006 |
| JP | 2006-309841 A | | 11/2006 |
| JP | 2007-026480 A | | 2/2007 |
| JP | 2007-226862 A | | 9/2007 |
| JP | 2007-250047 A | | 9/2007 |
| JP | 2008-142895 A | | 6/2008 |

OTHER PUBLICATIONS

Japanese Notice of Allowance issued in Japanese Application No. 2008-235395 mailed Oct. 23, 2012.

* cited by examiner

MAGNETIC RECORDING MEDIUM, METHOD OF MANUFACTURING MAGNETIC RECORDING MEDIUM, AND MAGNETIC RECORDING/REPRODUCING APPARATUS

BACKGROUND OF THE INVENTION

The present invention relates to a magnetic recording medium used for, for example, a hard disk device, a method of manufacturing a magnetic recording medium, and a magnetic recording/reproducing apparatus.

Priority is claimed on Japanese Patent Application No. 2008-235395, filed Sep. 12, 2008, the content of which is incorporated herein by reference.

RELATED ART

In recent years, the application range of magnetic recording apparatuses, such as magnetic disk apparatuses, flexible disk apparatuses, and magnetic tape apparatuses, has increased remarkably, and the importance thereof has increased. Therefore, a technique has been developed for significantly improving the recording density of magnetic recording media used in these apparatuses. In particular, the development of an MR (magnet resistive) head and a PRML (partial response maximum likelihood) technique has significantly increased recording density per unit area. In recent years, with the development of GMR (giant magnet resistive) heads and TMR (tunneling magnet resistive) heads, the recording density of the magnetic recording media has increased at a rate of doubling per year. There is a demand for a further increase in the recording density of the magnetic recording media. In order to meet such demand, it is necessary to improve the signal-to-noise ratio (SNR) and the resolution of a magnetic recording layer. In addition, in recent years, there has been an attempt to increase track density in addition to linear recording density, thereby improving recording density.

The latest magnetic recording apparatus has a track density of 300 kTPI. However, when the track density is increased, interference occurs between the magnetic recording information items of adjacent tracks, and a magnetization transition region, which is a boundary region therebetween, acts as a source of noise, which may cause a reduction in SNR. When the SNR is reduced, bit error rates deteriorate, which prevents improvements in recording density.

In order to improve the recording density of the magnetic recording medium, it is necessary to reduce the size of each recording bit on the magnetic recording medium and maximize magnetic film thickness and saturation magnetization for each recording bit. However, when the size of the recording bit is reduced, minimum magnetization volume per bit is reduced, and recording data is erased due to magnetization reversal caused by heat fluctuation.

When the track density is increased, the distance between the tracks is reduced. Therefore, the magnetic recording apparatus requires a very accurate track servo technique. In contrast, generally, a method has been used which performs recording with a large track width and performs reproduction with a track width smaller than that during recording to minimize the influence of adjacent tracks. However, in this method, it is possible to minimize the influence between the tracks, but it is difficult to obtain a sufficient reproduction output. Therefore, it is difficult to ensure a sufficient SNR.

In order to solve the problem of the heat fluctuation and ensure a sufficient SNR and a sufficient output, the following method has been proposed in which concave and convex portions are formed on the surface of a recording medium along the track to physically and magnetically separate the recording tracks, thereby preventing the interference between adjacent tracks and improving track density. Hereinafter, such a technique is referred to as a discrete track method, and a magnetic recording medium manufactured by the method is referred to as a discrete track medium.

In addition, a method of manufacturing a bit pattern medium in which the tracks of the discrete track medium are separated from each other in bit units has been proposed.

As an example of the discrete track medium, a magnetic recording medium has been known in which a magnetic layer is formed on a non-magnetic substrate having an uneven pattern formed on the surface thereof so as to form magnetic recording tracks and servo signal patterns that are physically separated from each other (for example, see Patent Document 1 (JP-A-2004-164692)). However, in the discrete track medium, a nano-level microfabrication technique is needed to form the uneven pattern in the magnetic layer, fill up the uneven pattern with a non-magnetic layer, and planarize the surface of the non-magnetic layer, which results in an increase in manufacturing costs.

Therefore, as a method of manufacturing the discrete track medium, a method has been proposed in which nitrogen or oxygen ions are implanted into a region (inter-magnetic-track region) between the magnetic tracks of a magnetic layer that has been formed previously, or a laser beam is radiated onto the region to change the magnetic characteristics of the region, thereby separating the magnetic tracks with the inter-magnetic-track region interposed therebetween (see Patent Document 2 (JP-A-5-205257), Patent Document 3 (JP-A-2006-209952), and Patent Document 4 (JP-A-2006-309841)). However, in the discrete track medium, information is likely to be erased due to the movement of a domain wall between recording bits in the magnetic recording track.

In order to solve the above-mentioned problem, a technique has been developed which provides a pinning site in the magnetic recording track of the discrete track medium to prevent the movement of the domain wall, thereby preventing information from being erased due to the movement of the domain wall (for example, see Patent Document 5 (JP-A-11-31318)).

[Patent Document 1] JP-A-2004-164692
[Patent Document 2] JP-A-5-205257
[Patent Document 3] JP-A-2006-209952
[Patent Document 4] JP-A-2006-309841
[Patent Document 5] JP-A-11-31318

However, in the discrete media according to the related art, it is necessary to physically form tracks. Therefore, there is a limitation in the shape of the discrete media, that is, the width and depth of the track. In order to obtain high recording density, the coercivity of the magnetic layer tends to increase. Therefore, in a small magnetic recording/reproducing head, a recording magnetic field is insufficient during a write operation, and it is difficult to obtain sufficient write characteristics (writability) from a high-coercivity magnetic recording medium.

The present invention has been made in order to solve the above-mentioned problems, and an object of the present invention is to provide a magnetic recording medium that has sufficient recording/reproducing characteristics and good write characteristics, and can correspond to high recording density, and a method of manufacturing the same.

In addition, another object of the present invention is to provide a magnetic recording/reproducing apparatus including the magnetic recording medium according to the present invention which has good recording density characteristics.

SUMMARY OF THE INVENTION

In order to achieve the above-mentioned objects, the present invention includes the following structures.

That is, according to a first aspect of the present invention, a magnetic recording medium includes a plurality of magnetic recording patterns that are magnetically separated from each other. Each of the magnetic recording patterns includes a low-coercivity region and a high-coercivity region having a coercivity higher than the low-coercivity region, and the high-coercivity region is arranged at the center of the low-coercivity region in a plan view.

According to a second aspect of the present invention, in the magnetic recording medium according to the first aspect, the coercivity of the high-coercivity region may be in the range of 2000 (Oe) to 6000 (Oe), and the coercivity of the low-coercivity region may be in the range of 100 (Oe) to 1000 (Oe).

According to a third aspect of the present invention, in the magnetic recording medium according to the first or second aspect, the high-coercivity region may have an inverted trapezoidal shape in a vertical cross-sectional view in which the width thereof is gradually reduced from the surface in the depth direction.

According to a fourth aspect of the present invention, in the magnetic recording medium according to any one of the first to third aspects, the magnetic recording pattern may be at least one of a recording track, a recording bit, and a servo signal.

According to a fifth aspect of the present invention, a method of manufacturing a magnetic recording medium includes: a step of forming a magnetic layer on a non-magnetic substrate; a coercivity reducing step of performing a coercivity reducing process on a predetermined region of the magnetic layer so as to form a low-coercivity region and a plurality of high-coercivity regions each of which is arranged at the center of the low-coercivity region in a plan view and has a coercivity higher than the low-coercivity region; and a separation step of performing a separation process that reduces the coercivity of a predetermined portion of the low-coercivity region to form a plurality of magnetic recording patterns, each having the low-coercivity region and the high-coercivity region, which is magnetically separated from each other.

According to a sixth aspect of the present invention, in the method of manufacturing a magnetic recording medium according to the fifth aspect, the coercivity reducing process may be a reactive plasma process and the separation process may be an ion implantation process.

According to a seventh aspect of the present invention, a magnetic recording/reproducing apparatus includes: the magnetic recording medium according to any one of the first to fourth aspects; a medium driving unit that drives the magnetic recording medium in a recording track direction; a magnetic head that includes a recording unit and a reproducing unit; a head moving unit that moves the magnetic head relative to the magnetic recording medium; and a recording/reproducing signal processing unit that inputs signals to the magnetic head and reproduces signals output from the magnetic head.

In the magnetic recording medium according to the above-mentioned aspect of the present invention, each of the magnetic recording patterns includes the low-coercivity region and the high-coercivity region having a coercivity higher than the low-coercivity region, and the high-coercivity region is arranged at the center of the low-coercivity region in a plan view. Therefore, when information is written on the magnetic recording pattern, the magnetization reversal of the low-coercivity region occurs easily, and the magnetization reversal of the low-coercivity region facilitates the magnetization reversal of the high-coercivity region such that the magnetization reversal of the high-coercivity region occurs easily. Therefore, according to the present invention, even when a magnetic head, which is reduced in size and has a weak write magnetic field corresponding to high recording density, is used, it is possible to achieve a magnetic recording medium with good write characteristics capable of reliably writing information on the magnetic recording patterns.

In addition, in the magnetic recording medium according to the above-mentioned aspect of the present invention, each of the magnetic recording patterns includes the low-coercivity region and the high-coercivity region having a coercivity higher than the low-coercivity region, and the high-coercivity region is arranged at the center of the low-coercivity region in a plan view. Therefore, since the high-coercivity regions between adjacent magnetic recording patterns are not adjacent to each other, the magnetization of the high-coercivity region is maintained in a stable state, and the magnetization of the low-coercivity region is stabilized by the magnetization coupling of the high-coercivity regions. In this way, when a magnetic field corresponding to the information signal written on the magnetic recording pattern is read, the magnetic recording pattern is hardly affected by the high-coercivity regions of adjacent magnetic recording patterns. Therefore, in the magnetic recording medium according to the present invention, the magnetic recording pattern is hardly affected by adjacent magnetic recording patterns during a read operation, and it is possible to stably read information signals, as compared to when the magnetic recording patterns have constant coercivity. As a result, it is not necessary to reduce the width of a read head of the magnetic head to be smaller than that of a write head, considering the influence of adjacent magnetic recording patterns, and it is possible to obtain a sufficient reproduction output and a high SNR using the magnetic head including the write head and the read head with the same width.

The magnetic recording/reproducing apparatus according to the present invention includes the magnetic recording medium with good write characteristics according to the present invention. Therefore, even when a small magnetic head is used which has a weak write magnetic field corresponding to high recording density, it is possible to achieve a magnetic recording medium with good write characteristics capable of reliably writing information on the magnetic recording patterns. In addition, according to the magnetic recording/reproducing apparatus of the present invention, it is possible to obtain a sufficient reproduction output and a high SNR using a magnetic head including a write head and a read head having the same width.

BRIEF DESCRIPTION OF THE DRAWINGS

FIG. 1(a) is a diagram illustrating the entire magnetic recording medium, and FIG. 1(b) is an enlarged plan view illustrating a portion of the magnetic recording medium shown in FIG. 1(a).

PREFERRED EMBODIMENTS

Hereinafter, exemplary embodiments of the present invention will be described with reference to the accompanying drawings.

"Magnetic Recording Medium"

Figure 1:
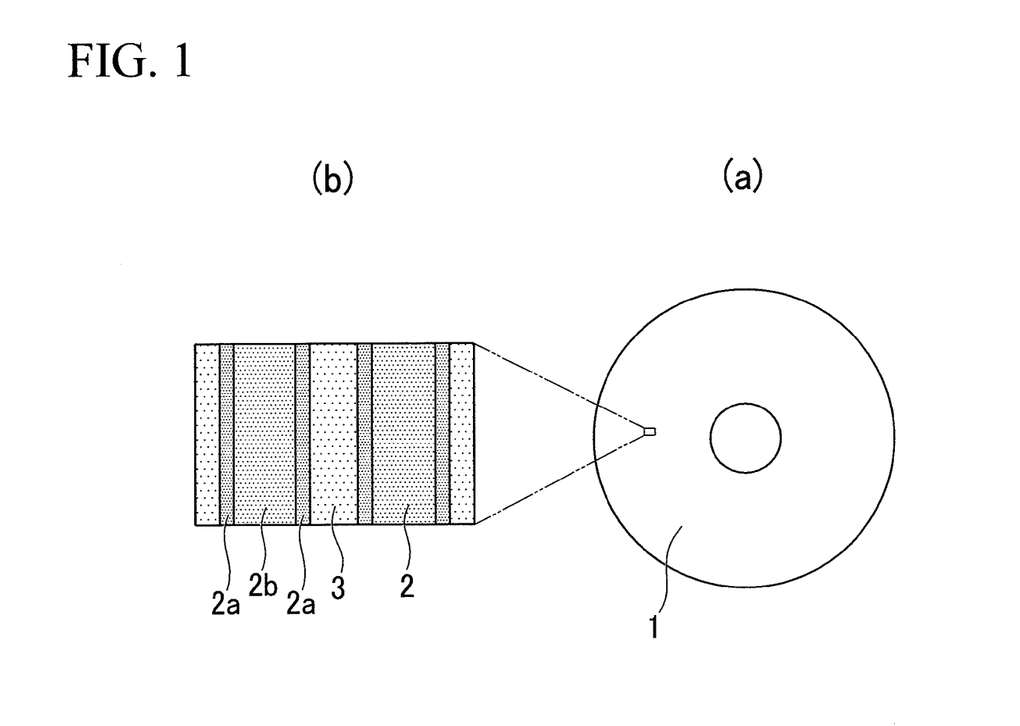
FIG. 1 is a plan view illustrating an example of a magnetic recording medium according to the present invention.
Figure 2A:
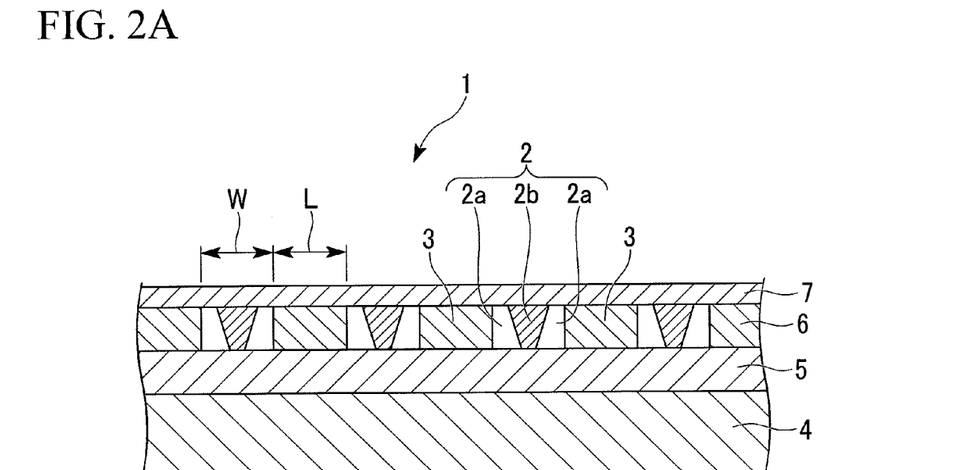
FIG. 2A is an enlarged vertical cross-sectional view illustrating a portion of the magnetic recording medium shown in FIG. 1.
Figure 2B:
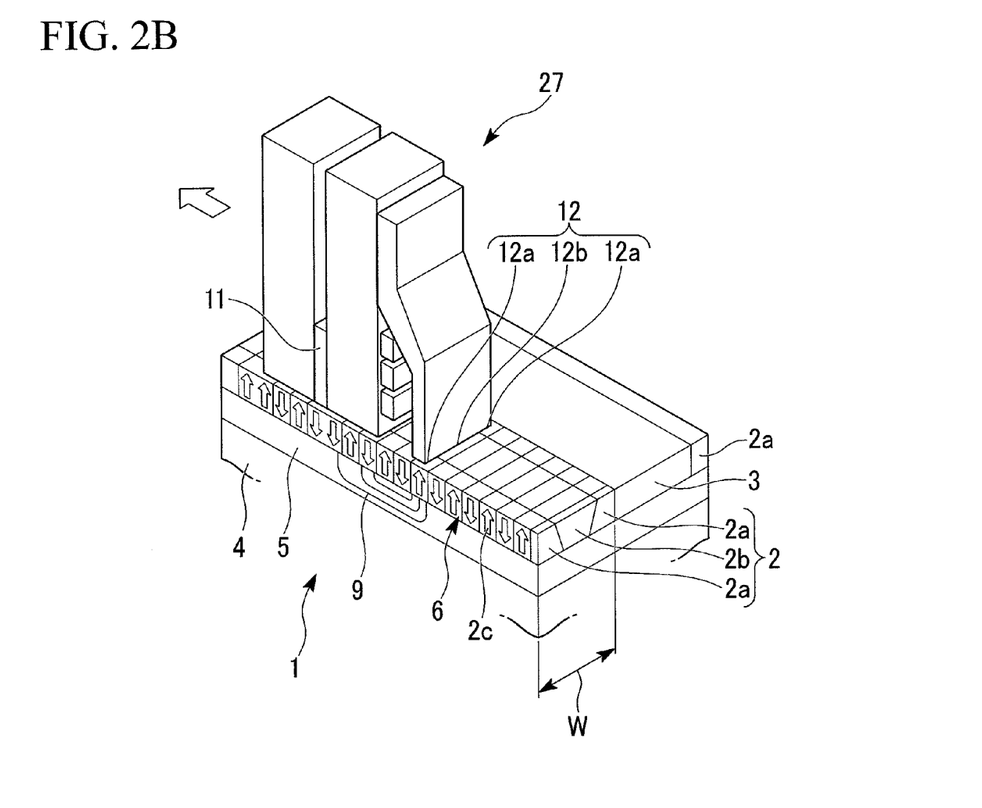
FIG. 2B is an enlarged perspective view illustrating a portion of the magnetic recording medium shown in FIG. 1 and a magnetic head.

FIG. 1 is a plan view illustrating an example of a magnetic recording medium according to the present invention. FIG. 1(a) is a plan view illustrating the entire magnetic recording medium and FIG. 1(b) is an enlarged plan view illustrating a portion of the magnetic recording medium shown in FIG. 1(a). FIG. 2A is an enlarged vertical cross-sectional view illustrating a portion of the magnetic recording medium shown in FIG. 1(a). FIG. 2B is an enlarged perspective view illustrating a portion of the magnetic recording medium shown in FIG. 1(a) and a magnetic head. In FIG. 2B, the traveling direction of the magnetic head relative to the magnetic recording medium is represented by a large arrow and is aligned with the circumferential direction of the magnetic recording medium. In FIG. 1(b) and FIG. 2B, a protective layer is not shown for easier viewing of the drawings.

As shown in FIG. 1(a), a magnetic recording medium 1 according to this embodiment is a plate member having a substantially annular shape in a plan view and includes a plurality of sectors (not shown), each having a recording region and a servo region, arranged in the circumferential direction so as to be divided from each other. The recording region includes a plurality of recording tracks for recording information signals (data) and the servo region has a servo signal pattern for detecting the position of each of the recording tracks in the width direction.

As shown in FIG. 2B, the magnetic recording medium 1 according to this embodiment is a discrete track medium including a magnetic layer 6 that is magnetized in the perpendicular direction of a non-magnetic substrate 4. A magnetic head 27 includes a read head 11 and a write head 12 and writes or reads information signals on or from the magnetic recording medium 1. In addition, as shown in FIG. 2A, in the magnetic recording medium 1 according to this embodiment, a soft magnetic layer 5, the magnetic layer 6, and a protective layer 7 are formed on the non-magnetic substrate 4 in this order.

As the non-magnetic substrate 4, any of the following non-magnetic substrates may be used: an Al alloy substrate made of, for example, an Al—Mg alloy having Al as a main component; a general soda glass substrate; an aluminosilicate-based glass substrate; a crystallized glass substrate; a silicon substrate; a titanium substrate; a ceramics substrate; and substrates made of various kinds of resins. Among the substrates, it is preferable to use an Al alloy substrate, a glass-based substrate, such as a crystallized glass substrate, or a silicon substrate.

The average surface roughness (Ra) of the non-magnetic substrate 4 is preferably equal to or less than 1 nm, more preferably equal to or less than 0.5 nm, and most preferably equal to or less than 0.1 nm.

The soft magnetic layer 5 is made of a soft magnetic material. Examples of the soft magnetic material forming the soft magnetic layer 5 include FeCo-based alloys (for example, FeCoB, FeCoSiB, FeCoZr, FeCoZrB, and FeCoZrBCu), FeTa-based alloys (for example, FeTaN and FeTaC), and Co-based alloys (for example, CoTaZr, CoZrNB, and CoB).

As shown in FIG. 1(b) and FIG. 2A, in the magnetic recording medium 1 according to this embodiment, a plurality of inter-magnetic-recording-pattern regions 3 and a plurality of magnetic recording patterns 2 are provided in the magnetic layer 6. The inter-magnetic-recording-pattern regions 3 are provided over the entire region except for the region in which the magnetic recording patterns 2 are provided in the magnetic layer 6, and magnetically separate the magnetic recording patterns 2.

Magnetic information is recorded on the magnetic recording patterns 2 and the coercivity of the magnetic recording pattern 2 is higher than that of the inter-magnetic-recording-pattern region 3. In this embodiment, the magnetic recording patterns 2 form all of the recording bits, servo signals, and recording tracks on which information signals are written by the user. The servo signal is composed of a servo signal pattern. Examples of the servo signal pattern include a burst pattern, a gray code pattern, and a preamble pattern. However, the servo signal pattern is not limited thereto.

It is preferable that the width W (corresponding to a recording track width) of the magnetic recording pattern 2 shown in FIGS. 2A and 2B be equal to or less than 200 nm, the width L (see FIG. 2A) of the inter-magnetic-recording-pattern region 3 forming the recording track be equal to or less than 100 nm, and the pitch between the magnetic recording patterns 2 (dimensions corresponding to a track pitch (that is, W+L)) be equal to or less than 300 nm. When the width W of the magnetic recording pattern 2 and the width L of the inter-magnetic-recording-pattern region 3 are in the above-mentioned ranges, it is possible to improve the recording density of the magnetic recording medium 1.

As shown in FIG. 1(b) and FIGS. 2A and 2B, the magnetic recording pattern 2 includes a low-coercivity region 2a and a high-coercivity region 2b with coercivity higher than that of the low-coercivity region 2a. As shown in FIG. 1(b) and FIGS. 2A and 2B, the high-coercivity region 2b extends in a strip shape between the low-coercivity regions 2a and is arranged at the center of the low-coercivity region 2a in a plan view. That is, the low-coercivity regions 2a are arranged on both sides of the high-coercivity regions 2b. In this embodiment, the high-coercivity region 2b and the low-coercivity region 2a forming the recording track extend in the circumferential direction of the magnetic recording medium 1, which is the traveling direction of the magnetic head 27 relative to the magnetic recording medium 1. In addition, in this embodiment, as shown in FIGS. 2A and 2B, the high-coercivity region 2b has an inverted trapezoidal shape in a vertical cross-sectional view in which the width thereof is gradually reduced from the surface in the depth direction.

It is preferable that the coercivity of the high-coercivity region 2b of the magnetic recording pattern 2 be in the range of 2000 (Oe) to 6000 (Oe) (1 (Oe) is about 79 A/m) and the coercivity of the low-coercivity region 2a of the magnetic recording pattern 2 be in the range of 100 (Oe) to 1000 (Oe).

When the coercivities of the high-coercivity region 2b and the low-coercivity region 2a are in the above-mentioned ranges, it is possible to further improve the writing characteristics of the magnetic recording medium 1 by using the write head 12. If the coercivity of the high-coercivity region 2b is higher than 6000 (Oe), the recording characteristics deteriorate. If the coercivity of the low-coercivity region 2a is lower than 100 (Oe), the recording characteristics are likely to be affected by an external magnetic field.

It is preferable that the inter-magnetic-recording-pattern region 3 be non-magnetic or have coercivity lower than 150 (Oe). The term "non-magnetic" means that the amount of magnetization detected by the magnetic head is equal to or less than a quarter of the amount of magnetization of the magnetic recording pattern. When the coercivities of the low-coercivity region 2a and the high-coercivity region 2b of the magnetic recording pattern 2 are in the above-mentioned ranges and the inter-magnetic-recording-pattern region 3 has the above-mentioned magnetic characteristics, it is possible to further improve the write characteristics of the magnetic recording medium 1. If the difference in coercivity between the low-coercivity region 2a and the inter-magnetic-recording-pattern region 3 is too small, the SN ratio is likely to be reduced. In addition, if the difference in coercivity between the low-coercivity region 2a and the inter-magnetic-recording-pattern region 3 is too large, it is difficult to perform a write operation, which results in the deterioration of the recording characteristics.

As shown in FIG. 2B, in the magnetic recording medium 1 according to this embodiment, the magnetic layer 6 is a perpendicular magnetic layer. In FIG. 2B, arrows represented in the magnetic layer 6 in the perpendicular direction of the non-magnetic substrate 4 indicate the magnetization directions of the magnetic recording patterns 2 in the magnetic layer 6. In this embodiment, as shown in FIG. 2B, the magnetization direction of the magnetic recording pattern 2 forming the recording track is reversed by the write head 12 of the magnetic head 27 according to the information signal for each recording bit 2c.

For example, as the perpendicular magnetic layer, an orientation control film is provided between the soft magnetic layer 5 and the magnetic layer 6. In addition, an intermediate film may be provided between the orientation control film and the magnetic layer 6. Therefore, when the magnetic layer 6 is the perpendicular magnetic layer, the orientation control film or a base layer (not shown) including the orientation control film and the intermediate film may be provided between the soft magnetic layer 5 and the magnetic layer 6.

The orientation control film is made of, for example, Pt, Pd, NiCr, or NiFeCr. In addition, the intermediate film is made of, for example, Ru.

The magnetic layer 6 may be a single layer or a laminate of two or more layers. The magnetic layer 6 is made of, for example, a CoCrPt-based alloy, a FePt-based alloy, a CoPt-based alloy, a FePd-based alloy, or a CoPd-based alloy. Among the above-mentioned materials, the magnetic layer 6 is preferably made of a material having a FePt-based alloy as a main component. Examples of the FePt-based alloy used for the magnetic layer 6 include 12Cr-36Fe-52Pt, 25Fe-30Co-45Pt, and 38Fe-10Co-5Ni-47Pt.

An oxide may be added to the magnetic layer 6 as a grain boundary forming material that forms a granular structure. It is preferable that at least one of a Si oxide, a Ti oxide, a W oxide, a Cr oxide, a Co oxide, a Ta oxide, and a Ru oxide be used as the oxide forming the granular structure.

The thickness of the magnetic layer 6 needs to be equal to or more than a predetermined value in order to obtain an output equal to or more than a predetermined value during reproduction. In general, all parameters, which are indexes of the recording/reproducing characteristics, deteriorate with an increase in output. From this point of view, the magnetic layer 6 needs to be formed with an appropriate thickness, taking into consideration the kind of magnetic alloy used and a laminate structure, such that sufficient head input/output characteristics are obtained. Specifically, the thickness of the magnetic layer 6 is preferably equal to or more than 3 nm and equal to less than 20 nm, and more preferably equal to or more than 5 nm and equal to or less than 15 nm.

In the present invention, it is preferable that the magnetic layer 6 be a perpendicular magnetic layer in order to obtain higher recording density. However, the magnetic layer 6 is not limited to the perpendicular magnetic layer, but it may be an in-plane magnetic layer. When the magnetic layer 6 is the in-plane magnetic layer, a base layer (not shown) is provided between the magnetic layer 6 and the soft magnetic layer 5, if necessary. Specifically, for example, a laminated structure of a base layer including a non-magnetic CrMo-based alloy as a main material and a magnetic layer including a ferromagnetic CoCrPtTa-based alloy as a main material is used as the in-plane magnetic layer.

The protective layer 7 may be made of a carbon material, such as carbon (C) including diamond like carbon, hydrogenated carbon (H×C), nitrogenated carbon (CN), amorphous carbon, or silicon carbide (SiC), or a material that is generally used for the protective layer, such as $SiO_2$, $Zr_2O_3$, or TiN.

The protective layer 7 may be a single layer or a laminate of two or more layers.

It is preferable that the thickness of the protective layer 7 be less than 10 nm. If the thickness of the protective layer 7 is more than 10 nm, the distance between the magnetic head 27 and the magnetic layer 6 is increased. As a result, there is a concern that the intensity of input/output signals will be insufficient.

It is preferable to form a lubrication layer (not shown) on the protective layer 7. For example, a fluorine-based lubricant, a hydrocarbon-based lubricant, or a mixture thereof may be used for the lubrication layer.

The lubrication layer is generally formed with a thickness of 1 to 4 nm.

"Method of Manufacturing Magnetic Recording Medium"

Figure 3:
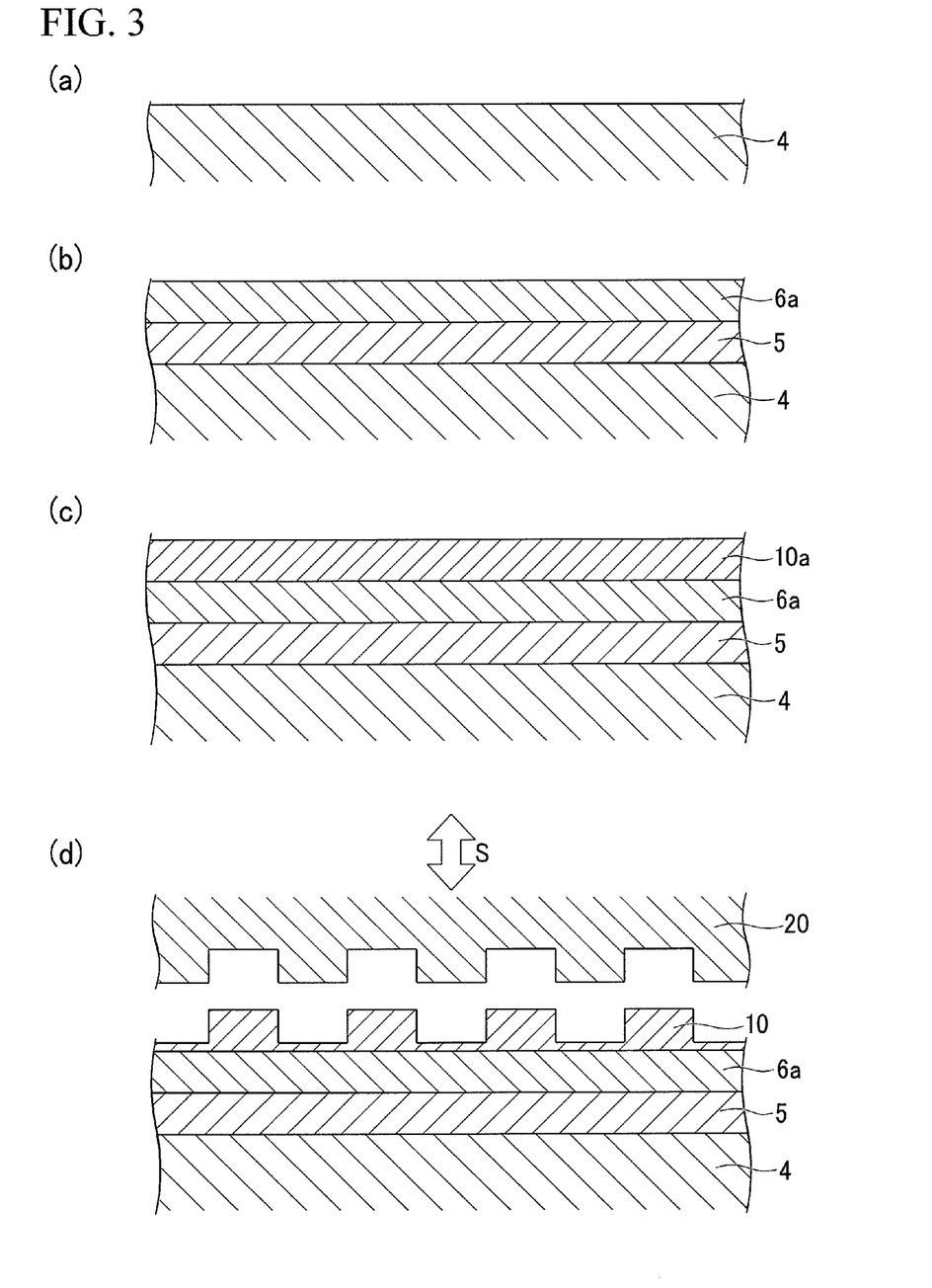
FIG. 3 is a process diagram illustrating a method of manufacturing a magnetic recording medium 1 shown in FIGS. 1, 2A, and 2B.
Figure 4:
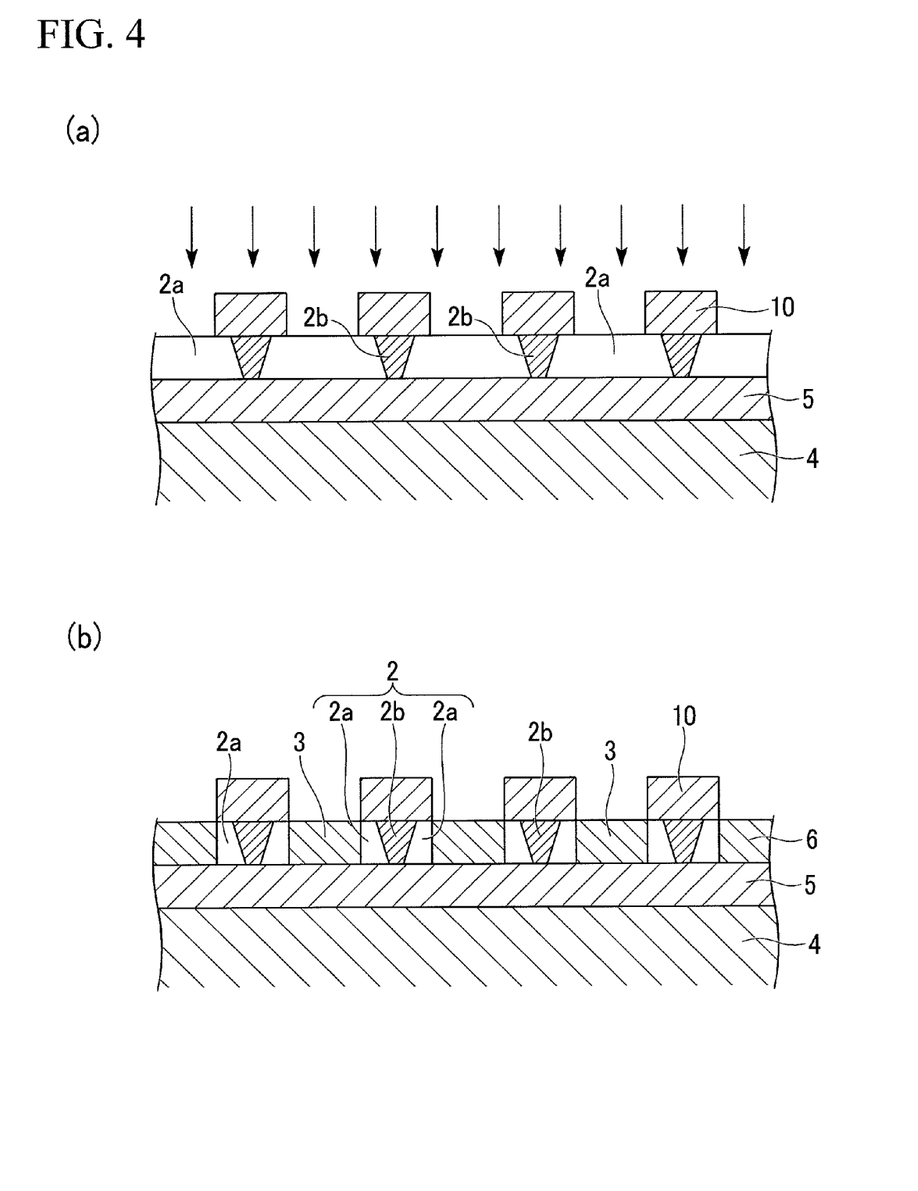
FIG. 4 is a process diagram illustrating the method of manufacturing the magnetic recording medium 1 shown in FIGS. 1, 2A, and 2B.

Next, a method of manufacturing the magnetic recording medium 1 according to the present invention shown in FIGS. 1, 2A, and 2B will be described. FIGS. 3 and 4 are process diagrams illustrating the method of manufacturing the magnetic recording medium 1 shown in FIGS. 1, 2A, and 2B.

[1] In order to manufacture the magnetic recording medium 1 shown in FIGS. 1, 2A, and 2B, first, as shown in FIG. 3(a), the non-magnetic substrate 4 is prepared. Then, as shown in FIG. 3(b), the soft magnetic layer 5 and a magnetic layer 6a including the magnetic recording patterns 2 and the inter-magnetic-recording-pattern regions 3 are sequentially formed on the entire upper surface of the non-magnetic substrate 4 by a thin film forming technique such as a sputtering method. In this case, it is preferable that the coercivity (Hc) of the magnetic layer 6a be in the range of 2000 (Oe) to 6000 (Oe).

[2] Then, a resist pattern 10 is formed on the magnetic layer 6a at a position corresponding to the magnetic recording pattern 2 by, for example, the following method.

First, as shown in FIG. 3(c), a resist is coated on the entire surface of the magnetic layer 6a to form a resist film 10a. Then, a stamper 20 having a concave pattern corresponding to the magnetic recording pattern 2 comes into close contact with the surface of the resist film 10a, and is then pressed against the resist film at a high pressure S to form a resist layer having a pattern corresponding to the magnetic recording pattern 2, as shown in FIG. 3(*d*). Then, the resist layer is hardened by an appropriate method corresponding to the material forming the resist layer, and concave portions of the resist layer are removed by, for example, a dry etching method to expose the surface of the magnetic layer 6*a*, thereby forming the resist pattern 10 having a shape corresponding to the magnetic recording pattern 2, as shown in FIG. 4(*a*).

The shape of the resist pattern 10 shown in FIG. 4(*a*) corresponds to the shape of the region in which the recording tracks, the recording bits, and the servo signals are all formed. Therefore, a region that is not covered with the resist pattern 10 corresponds to the inter-magnetic-recording-pattern region 3.

For example, a thermosetting resin, an ultraviolet curable resin, or SOG (spin on glass) may be used as the resist forming the resist pattern 10.

For example, a metal plate having on one surface a concave pattern that is opposite to the magnetic recording pattern 2 and is formed by, for example, an electron beam lithography method may be used as the stamper 20. Any material may be used for the stamper 20 as long as it can have sufficient hardness and durability to resist manufacturing processes. For example, the stamper 20 may be made of a Ni alloy.

In this embodiment, the resist pattern 10 is formed by the stamper 20. However, the resist pattern 10 may be formed by a photolithography method.

Then, as shown in FIG. 4(*a*), a coercivity reducing process is performed on a region of the magnetic layer 6*a* that is exposed from the resist pattern 10. In this way, the low-coercivity region 2*a* and the high-coercivity region 2*b* that is arranged at the center of the low-coercivity region 2*a* in a plan view and has coercivity higher than the low-coercivity region 2*a* are formed in the magnetic layer 6*a* (coercivity reducing step).

It is preferable that the coercivity of the low-coercivity region 2*a* of the magnetic layer 6*a* formed by the coercivity reducing step be in the range of 100 (Oe) to 1000 (Oe).

It is preferable that the coercivity reducing process according to this embodiment be a reactive plasma process. In the coercivity reducing process, when a process using an active species with low directivity, such as reactive plasma, is performed, the reaction region of the magnetic layer 6*a* formed by the coercivity reducing process extends to a portion of the magnetic layer 6*a* that is disposed below the resist pattern 10 in the vicinity of the edge of the resist pattern 10, in addition to a portion of the magnetic layer 6*a* that is not covered with the resist pattern 10 in a plan view. In this way, as shown in FIG. 4(*a*), the shape of the high-coercivity region 2*b* in a vertical cross-sectional view is an inverted trapezoid whose width is gradually reduced from the surface in the depth direction.

For example, inductively coupled plasma (ICP) or reactive ion plasma (RIE) may be used as the reactive plasma.

The inductively coupled plasma is high-temperature plasma obtained by applying a high voltage to gas so as to generate plasma and applying a high-frequency variable magnetic field so as to generate Joule heat in the plasma using overcurrent. In the inductively coupled plasma, electron density is high. Therefore, for example, even when the area of the magnetic layer 6*a* is relatively large, it is possible to change the magnetic characteristics of a portion of the magnetic layer 6*a*, which will be the low-coercivity region 2*a*, with high efficiency in a short period of time, as compared to when ion implantation is used as the coercivity reducing process.

The reactive ion plasma is high-reactivity plasma obtained by adding a reactive gas, such as $H_2$, $N_2$, $O_2$, $SF_6$, $CHF_3$, $CF_4$, or $CCl_4$, to plasma. The use of the plasma makes it possible to reduce the coercivity (Hc) of the magnetic layer 6*a* with high efficiency.

In the coercivity reducing process, when the reactive plasma process is used, it is preferable that the magnetic characteristics (coercivity) of the magnetic layer 6*a* be reduced by the reaction between magnetic metal forming the magnetic layer 6*a* and atoms or ions in the reactive plasma. Specifically, the reaction includes a variation in the crystal structure of the magnetic metal, a variation in the composition of the magnetic metal, oxidation of the magnetic metal, nitridation of the magnetic metal, silicidation of the magnetic metal, and carbonization of the magnetic metal due to the infiltration of atoms in the reactive plasma into the magnetic metal forming the magnetic layer 6*a*.

It is preferable that the reactive plasma process use reactive plasma including oxygen atoms. When the reactive plasma including the oxygen atoms is used, the magnetic layer 6*a* is partially oxidized by the reaction between the magnetic metal forming the magnetic layer 6*a* and the oxygen atoms in the reactive plasma. Therefore, the coercivity (Hc) of the magnetic layer 6*a* is reduced with high efficiency. As a result, it is possible to form the low-coercivity region 2*a* and the high-coercivity region 2*b* having coercivity higher than the low-coercivity region 2*a* in the magnetic layer 6*a* in a short period of time.

The reactive plasma process preferably uses reactive plasma including halogen atoms, and more preferably reactive plasma including F atoms among the halogen atoms.

When the halogen atoms are included in the reactive plasma, it is possible to change the magnetic characteristics of the magnetic layer 6*a* (reduce the coercivity of the magnetic layer) due to the reaction between the halogen atoms in the reactive plasma and the magnetic alloy forming the magnetic layer 6*a*. The detailed reason is not clear, but it is conceivable that the halogen atoms in the reactive plasma etch foreign materials adhered to the surface of the magnetic layer 6*a* so as to clean the surface of the magnetic layer 6*a*, and the reactivity of the magnetic layer 6*a* is increased. In addition, it is considered that the halogen atoms contribute to reaction with the cleaned magnetic layer 6*a* with high efficiency. In particular, when the F atoms are used as the halogen atoms, it is possible to significantly improve the above-mentioned effects.

The halogen atoms may be included in the reactive plasma together with an oxygen element. When the reactive plasma including the halogen atoms and the oxygen element is used, the reactivity between the magnetic metal forming the magnetic layer 6*a* and oxygen atoms is increased by the halogen atoms. Therefore, it is possible to more effectively change the magnetic characteristics of the magnetic layer 6*a* (reduce the coercivity of the magnetic layer).

Then, a separation process is performed to reduce the coercivity of a portion of the low-coercivity region 2*a* that is to be the inter-magnetic-recording-pattern region 3 and is not covered with the resist pattern 10. In this way, as shown in FIG. 4(*b*), the magnetic layer 6 is formed which includes a plurality of magnetic recording patterns 2, each having the low-coercivity region 2*a* and the high-coercivity region 2*b* arranged at the center of the low-coercivity region 2*a* in a plan view, magnetically separated from each other (separation step).

It is preferable that the coercivity of a portion of the low-coercivity region 2*a* that is changed into the inter-magnetic-recording-pattern region 3 by the separation step be lower than 100 (Oe).

In this embodiment, it is preferable that the separation process reducing the coercivity of the low-coercivity region 2a be an ion implantation process. In the separation process, when a process, such as ion implantation, using an active species with high directivity which is accelerated by a bias voltage is used, reaction occurs only in a portion of the low-coercivity region 2a that is not covered with the resist pattern 10 in a plan view by the separation process. Therefore, as shown in FIG. 4(b), the coercivity of a portion of the low-coercivity region 2a that is not covered with the resist pattern 10 in a plan view is lowered so as to become the inter-magnetic-recording-pattern region 3. However, the coercivity of a portion of the low-coercivity region 2a that is disposed below the resist pattern 10 in the vicinity of the edge of the resist pattern 10 is maintained after the coercivity reducing process. As a result, a portion of the low-coercivity region 2a disposed below the resist pattern 10 serves as the low-coercivity region 2a of the magnetic recording pattern 2.

In the ion implantation process, for example, Ar, Ne, He, and N ions are implanted.

An example of the method of forming the high-coercivity region, the low-coercivity region, and the inter-magnetic-recording-pattern region by a combination of the reactive plasma process and the ion implantation process has been described above. However, other methods may be used to form the regions. For example, in FIG. 4(a), when the resist pattern 10 has a trapezoidal shape in a cross-sectional view, a small amount of ion is implanted into a side surface corresponding to the side of the trapezoid, and a portion of the magnetic layer below the side surface becomes the low-coercivity region. Since no ion is implanted into the upper surface corresponding to the upper side of the trapezoid, a portion of the magnetic layer arranged below the upper surface becomes the high-coercivity region, and a region that is not covered with the trapezoid becomes the inter-magnetic-recording-pattern region. In addition, in FIG. 4(a), ions may be implanted in an oblique direction to change a portion of the magnetic layer below the resist pattern 10 into the low-coercivity region, and then ions may be implanted in the perpendicular direction of the surface of the substrate to change only a portion of the magnetic layer that is not covered with the resist pattern 10 into the inter-magnetic-recording-pattern region.

After the coercivity reducing step and the separation step are performed in this way, the resist pattern 10 is removed from the magnetic layer 6 shown in FIG. 4(b). A method of removing the resist pattern 10 is not particularly limited. For example, dry etching, reactivity ion etching, ion milling, or wet etching may be used to remove the resist pattern 10.

[3] Then, the protective layer 7 is formed on the magnetic layer 6. A method of forming the protective layer 7 is not particularly limited. For example, when the protective layer 7 includes diamond-like carbon as a main component, plasma CVD may be used to form the protective layer.

Then, a lubricant is coated on the surface of the protective layer 7 to form a lubrication layer (not shown).

In this way, the magnetic recording medium 1 according to this embodiment shown in FIGS. 1, 2A, and 2B is obtained.

The magnetic recording medium 1 according to this embodiment includes the magnetic recording patterns 2, each having the low-coercivity region 2a and the high-coercivity region 2b having coercivity higher than the low-coercivity region 2a, and the high-coercivity region 2b is arranged at the center of the low-coercivity region 2a in a plan view. Even when the magnetic head 27 is used which has a weak write magnetic field corresponding to high recording density, it is possible obtain to good write characteristics capable of reliably writing information on the magnetic recording patterns 2.

Next, the magnetization reversal of the magnetic recording pattern 2 when information signals are written on the magnetic recording medium 1 according to this embodiment will be described in detail with reference to FIG. 2B.

When the magnetic head 27 is used to write information signals on the magnetic recording patterns 2 of the magnetic recording medium 1 according to this embodiment, as shown in FIG. 2B, the write head 12 of the magnetic head 27 is moved adjacent to the magnetic recording patterns 2 in the traveling direction represented by an arrow along the circumferential direction of the magnetic recording medium 1 so as to apply a perpendicular magnetic field 9 corresponding to the information signal to be written by the write head 12 to the magnetic recording patterns 2.

As shown in FIG. 2B, the magnetic head 27 includes the read head 11 (reproducing unit) and the write head 12 (recording unit). The width of the read head 11 of the magnetic head 27 is equal to or less than that of the write head 12, and the width of each of the read head 11 and the write head 12 is less than the width W of the magnetic recording pattern 2. In addition, the intensity of the magnetic field 9 generated by the write head 12 is the highest at a central portion 12b of the write head 12 in the width direction, and is reduced toward the edge 12a. When the information signals are written on the magnetic recording patterns 2, as shown in FIG. 2B, the central portion 12b of the write head 12 is arranged so as to face the high-coercivity region 2b, and a portion of the write head 12 close to the edge 12a is arranged so as to face the low-coercivity region 2a.

The intensity of the magnetic field 9 applied from a portion of the write head 12 close to the edge 12a to the magnetic recording pattern 2 is lower than that of the magnetic field 9 applied from the central portion 12b of the write head 12 to the magnetic recording pattern 2. However, as shown in FIG. 2B, since a portion of the write head 12 close to the edge 12a is arranged so as to face the low-coercivity region 2a, the magnetization of the low-coercivity region 2a is easily reversed by the magnetic field 9 applied from a portion of the write head 12 close to the edge 12a.

In addition, since the magnetization reversal of the low-coercivity region 2a facilitates the magnetization reversal of the high-coercivity region 2b, the magnetization of the high-coercivity region 2b is reversed with the magnetization reversal of the low-coercivity region 2a. A relatively strong magnetic field is applied from the central portion 12b of the write head 12 to the high-coercivity region 2b. Therefore, even though the high-coercivity region 2b has coercivity higher than the low-coercivity region 2a, the magnetization reversal of the high-coercivity region 2b occurs easily.

As such, in the magnetic recording medium 1 according to this embodiment, the magnetization reversal of the magnetic recording pattern 2 occurs depending on the intensity distribution of the magnetic field 9 applied by the write head 12 when a write operation is performed. Therefore, in the magnetic recording medium 1 according to this embodiment, even when the magnetic head 27 is used which applies a weak magnetic field 9 corresponding to high recording density during a write operation, the write head 12 can generate a sufficiently strong magnetic field 9 to write information on the magnetic recording pattern 2 and perform stable recording on the magnetic recording pattern 2. Therefore, it is possible to obtain good write characteristics.

In contrast, for example, when the magnetic recording patterns has constant coercivity and the magnetic head 27 that applies a weak magnetic field 9 during the write operation is used to write information, the magnetization of a peripheral portion of the magnetic recording pattern 2 facing a portion of the write head 12 close to the edge 12a is less likely to be reversed, since a weak magnetic field is applied from a portion of the write head 12 close to the edge 12a to the magnetic recording pattern. In this case, it may be difficult to write information on the magnetic recording pattern. In order to easily generate the magnetization reversal even when the magnetic field applied during the write operation is weak, it is considered to reduce the overall coercivity (Hc) of the magnetic recording patterns. However, when the overall coercivity (Hc) of the magnetic recording patterns is reduced, there is a concern that the recording density of the magnetic recording medium will be insufficient.

In the magnetic recording medium 1 according to this embodiment, the high-coercivity region 2b has an inverted trapezoidal shape in a vertical cross-sectional view in which the width thereof is gradually reduced from the surface in the depth direction. Therefore, as described above, it is possible to obtain good write characteristics.

As shown in FIG. 2B, the magnetic field 9 applied from the write head 12 of the magnetic head 27 during the write operation is reversed by the soft magnetic layer 5 and then returns to the magnetic head 27. In this case, the density of the magnetic field returning to the magnetic head 27 is lower than that of the magnetic field generated by the magnetic head 27 such that the information signal recorded on the magnetic recording pattern 2 is not erased by the magnetic field returning to the magnetic head 27. Therefore, the density of the magnetic field applied from the write head 12 shown in FIG. 2B is reduced toward the soft magnetic layer 5 in the magnetic recording pattern 2 (from the surface in the depth direction).

Therefore, when the high-coercivity region 2b of the magnetic recording pattern 2 has a trapezoidal shape, the side surface of the low-coercivity region 2a that comes into contact with the high-coercivity region 2b is an inclined plane, and the area of the low-coercivity region 2a in which magnetization reversal occurs easily is gradually increased from the surface in the depth direction, the ratio of the low-coercivity region 2a in the magnetic recording pattern 2 is increased from the surface in the depth direction (toward the soft magnetic layer 5), and magnetization reversal occurs easily in the depth direction from the surface of the magnetic recording pattern 2. In addition, since the magnetization reversal of the low-coercivity region 2a in the depth direction from the surface of the magnetic recording pattern 2 facilitates the magnetization reversal of the high-coercivity region 2b whose width is increased toward the surface thereof, the magnetization reversal of the high-coercivity region 2b occurs easily. Therefore, when the high-coercivity region 2b has an inverted trapezoidal shape in a vertical cross-sectional view, it is possible to easily write information on the magnetic recording pattern 2.

In the magnetic recording medium 1 according to this embodiment, each of the magnetic recording patterns 2 includes the low-coercivity region 2a and the high-coercivity region 2b having coercivity higher than the low-coercivity region 2a, and the high-coercivity region 2b is arranged at the center of the low-coercivity region 2a in a plan view. Therefore, it is possible to reduce the influence of adjacent magnetic recording patterns 2 during a read operation, as compared to when the magnetic recording patterns 2 have constant coercivity.

When the magnetic head 27 shown in FIG. 2B is used to read information signals from the magnetic recording medium 1 according to this embodiment, the read head 11 of the magnetic head 27 is moved adjacent to the magnetic recording patterns 2 in the traveling direction represented by an arrow along the circumferential direction of the magnetic recording medium 1 so as to read the magnetization of the magnetic recording patterns 2 by the read head 11. In this case, in the magnetic recording medium 1 according to this embodiment, since the high-coercivity regions 2b between adjacent magnetic recording patterns 2 are not adjacent to each other, the magnetization of the high-coercivity region 2b is maintained in a stable state and the magnetization of the low-coercivity region 2a is stabilized by the magnetization coupling of the high-coercivity regions 2b. In this way, when a magnetic field corresponding to the information signal written on the magnetic recording pattern 2 is read, the magnetic recording pattern 2 is hardly affected by the high-coercivity regions 2b of adjacent magnetic recording patterns 2. As a result, in the magnetic recording medium 1 according to this embodiment, the influence of adjacent magnetic recording patterns 2 is reduced during the read operation, and it is possible to stably read information signals, as compared to when the magnetic recording patterns have constant coercivity. In addition, it is not necessary to reduce the width of the read head 11 of the magnetic head 27 to be smaller than that of the write head 12, considering the influence of adjacent magnetic recording patterns 2, and it is possible to obtain a sufficient reproduction output and a high SNR using the magnetic head 27 including the write head 12 and the read head 11 having the same width.

A method of manufacturing the magnetic recording medium 1 according to this embodiment includes a step of forming the magnetic layer 6a on the non-magnetic substrate 4, a coercivity reducing step of performing a coercivity reducing process on a predetermined region of the magnetic layer 6a to form the low-coercivity region 2a and the high-coercivity region 2b that is arranged at the center of the low-coercivity region 2a in a plan view, and a separation step of performing a separation process that reduces the coercivity of a portion of the low-coercivity region 2a, which will be the inter-magnetic-recording-pattern region 3, to form a plurality of magnetic recording patterns 2, each having the low-coercivity region 2a and the high-coercivity region 2b, which are magnetically separated from each other by the inter-magnetic-recording-pattern regions 3. According to this manufacturing method, it is possible to obtain the magnetic recording medium 1 according to this embodiment with good write characteristics.

In the method of manufacturing the magnetic recording medium 1 according to this embodiment, when the coercivity reducing process is a reactive plasma process and the separation process is an ion implantation process, it is possible to use one resist pattern 10 to easily form the high-coercivity region 2b having an inverted trapezoidal shape in a cross-sectional view.

"Other Embodiments"

Figure 5:
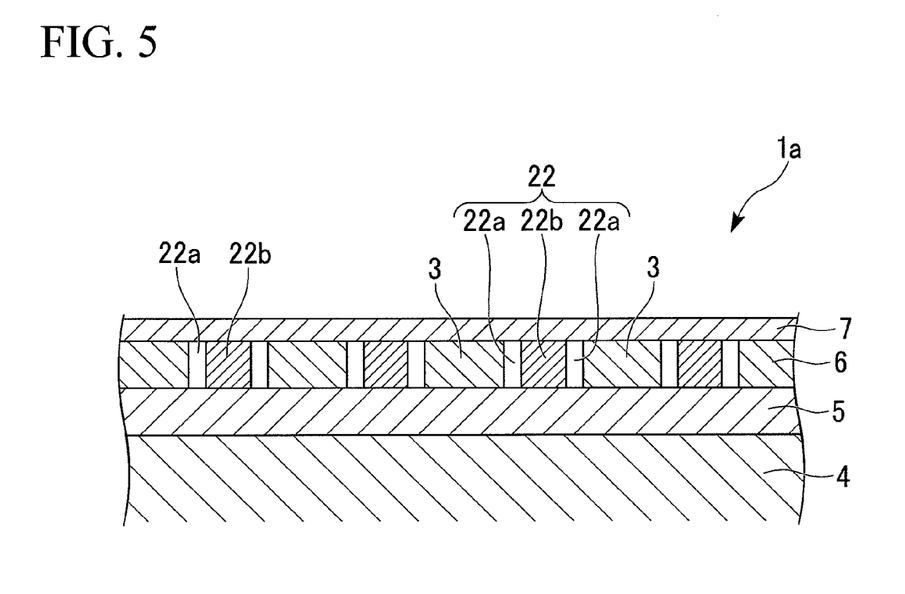
FIG. 5 is an enlarged vertical cross-sectional view illustrating a portion of a magnetic recording medium according to another embodiment of the present invention.

FIG. 5 is an enlarged vertical cross-sectional view illustrating a portion of a magnetic recording medium according to another embodiment of the present invention. A magnetic recording medium 1a shown in FIG. 5 is similar to the magnetic recording medium 1 shown in FIG. 1 except for the shapes of a low-coercivity region 22a and a high-coercivity region 22b of a magnetic recording pattern 22 in a vertical cross-sectional view. Therefore, the same components as those in the magnetic recording medium shown in FIG. 1 are denoted by the same reference numerals, and a description thereof will be omitted.

In the magnetic recording medium 1a shown in FIG. 5, the low-coercivity region 22a and the high-coercivity region 22b have a substantially constant width in the depth direction from the surface in a vertical cross-sectional view.

Figure 6:
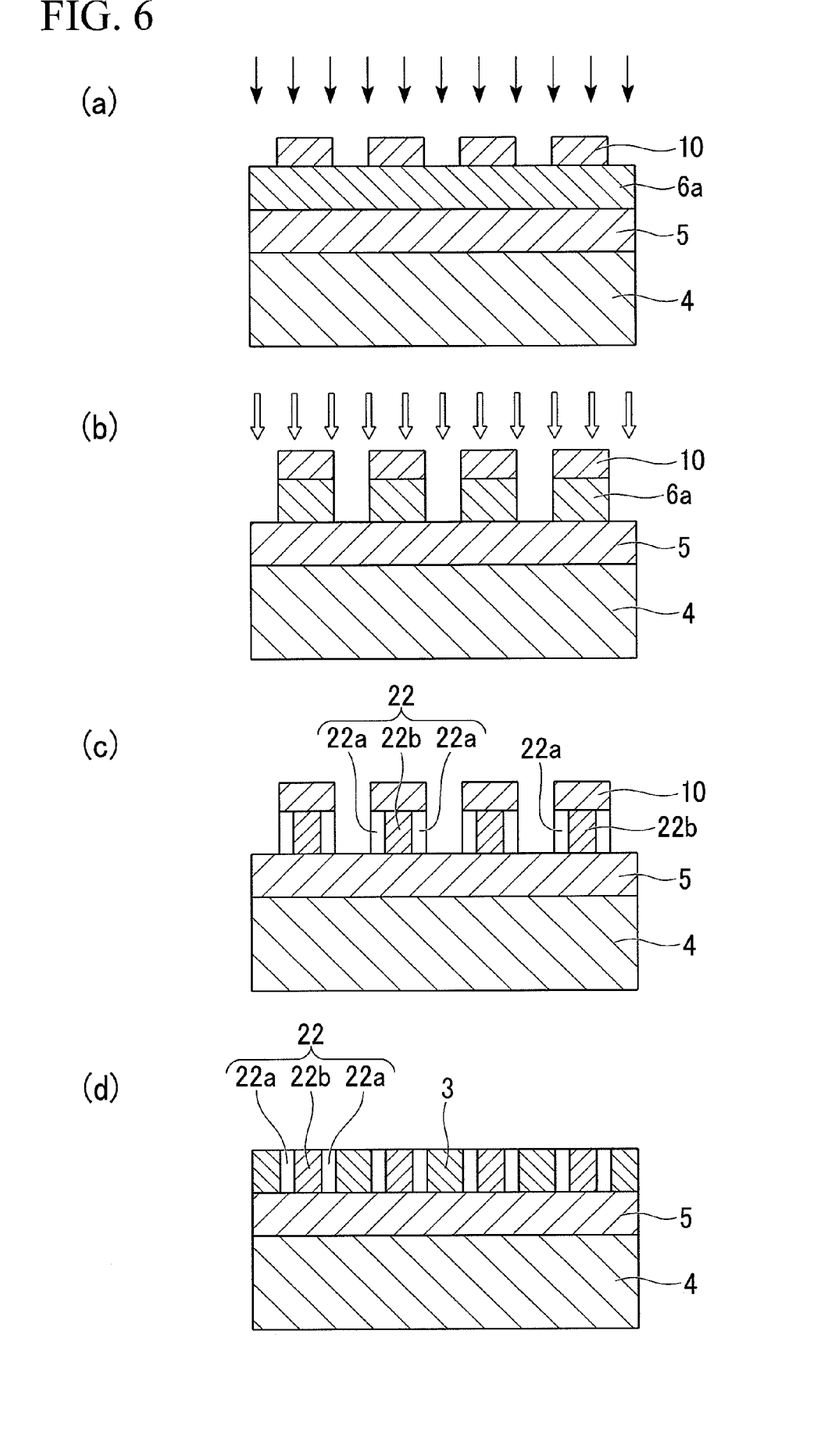
FIG. 6 is a process diagram illustrating a method of manufacturing the magnetic recording medium shown in FIG. 5.

Next, an example of a method of manufacturing the magnetic recording medium 1a shown in FIG. 5 will be described with reference to FIG. 6. FIG. 6 is a process diagram illustrating the method of manufacturing the magnetic recording medium 1a shown in FIG. 5.

In the method of manufacturing the magnetic recording medium 1a shown in FIG. 5, first, a soft magnetic layer 5 and a magnetic layer 6a, which will be the magnetic recording pattern 22, are sequentially formed on the entire surface of a non-magnetic substrate 4, similar to the magnetic recording medium 1 shown in FIG. 1.

Then, similar to the magnetic recording medium 1 shown in FIG. 1, a resist pattern 10 shown in FIG. 6(a) is formed on the magnetic layer 6a at a position corresponding to the magnetic recording pattern 22.

Then, as shown in FIG. 6(b), the magnetic layer 6a exposed from the resist pattern 10 is removed by, for example, dry etching using Ar.

Then, as shown in FIG. 6(b), a coercivity reducing process is performed on the magnetic layer 6a whose side surface is exposed. In this way, as shown in FIG. 6(c), the low-coercivity region 22a and the high-coercivity region 22b that is arranged at the center of the low-coercivity region 22a in a plan view and has coercivity lower than the low-coercivity region 22a are formed in the magnetic layer 6a. It is preferable that the coercivity of the magnetic layer 6a reduced by the coercivity reducing process be in the range of 100 (Oe) to 1000 (Oe).

It is preferable that the coercivity reducing process be a reactive plasma process. In the coercivity reducing process, a process using an active species with low directivity, such as reactive plasma, is performed, the reaction region of the magnetic layer 6a formed by the coercivity reducing process extends from the side surface of the magnetic layer 6a to a portion of the magnetic layer 6a that is disposed below the resist pattern 10 in the vicinity of the edge of the resist pattern 10. In this way, as shown in FIG. 6(c), the low-coercivity region 22a and the high-coercivity region 22b have a substantially constant width in the depth direction from the surfaces thereof in a vertical cross-sectional view.

In addition, in this process, it is possible to form the high-coercivity region 22b having an inverted trapezoidal shape in a cross-sectional view by changing the generation conditions of the reactive plasma. For example, when the resist pattern 10 is made of a material capable of easily deactivating radicals in the reactive plasma, the density of the radicals is reduced in the vicinity of the resist pattern 10, which prevents the magnetic layer from being reformed due to the reactive plasma. Therefore, it is possible to expand the high-coercivity region in the vicinity of the resist pattern 10.

For example, inductively coupled plasma (ICP) or reactive ion plasma (RIE) may be used as the reactive plasma.

Then, a non-magnetic material, such as C, B, Ti, Zr, Cr, Mo, Ta, W, Ni, Ru, Pd, or Pt, or a material having a coercivity of less than 150 (Oe) is coated on a region that is not covered with the resist pattern 10 by, for example, a sputtering method to form the inter-magnetic-recording-pattern regions 3, as shown in FIG. 6(d). Then, similar to the magnetic recording medium 1 shown in FIG. 1, the resist pattern 10 is removed.

Then, the surfaces of the magnetic recording pattern 22 and the inter-magnetic-recording-pattern region 3 are planarized by, for example, a dry etching method.

Then, similar to the magnetic recording medium 1 shown in FIG. 1, a protective layer 7 and a lubrication layer (not shown) are sequentially formed.

In this way, the magnetic recording medium 1a shown in FIG. 5 is obtained.

In the magnetic recording medium 1a shown in FIG. 5, each of the magnetic recording patterns 22 includes the low-coercivity region 22a and the high-coercivity region 22b having coercivity higher than the low-coercivity region 22a, and the high-coercivity region 22b is arranged at the center of the low-coercivity region 22a in a plan view. Therefore, even when the magnetic head 27 is used which has a weak write magnetic field corresponding to high recording density, it is possible obtain good write characteristics capable of reliably writing information on the magnetic recording patterns 22.

In addition, similar to the magnetic recording medium 1 shown in FIG. 1, in the magnetic recording medium 1a shown in FIG. 5, the magnetic recording pattern 22 is hardly affected by adjacent magnetic recording patterns 22 during the read operation, as compared to when the magnetic recording patterns have constant coercivity.

In the above-described embodiment, the discrete track medium has been described as an example, but the present invention is not limited to the discrete track medium. For example, the present invention may be applied to bit pattern media in which the center of a bit is a high-coercivity region and the periphery of the bit is a low-coercivity region.

"Magnetic Recording/Reproducing Apparatus"

Figure 7:
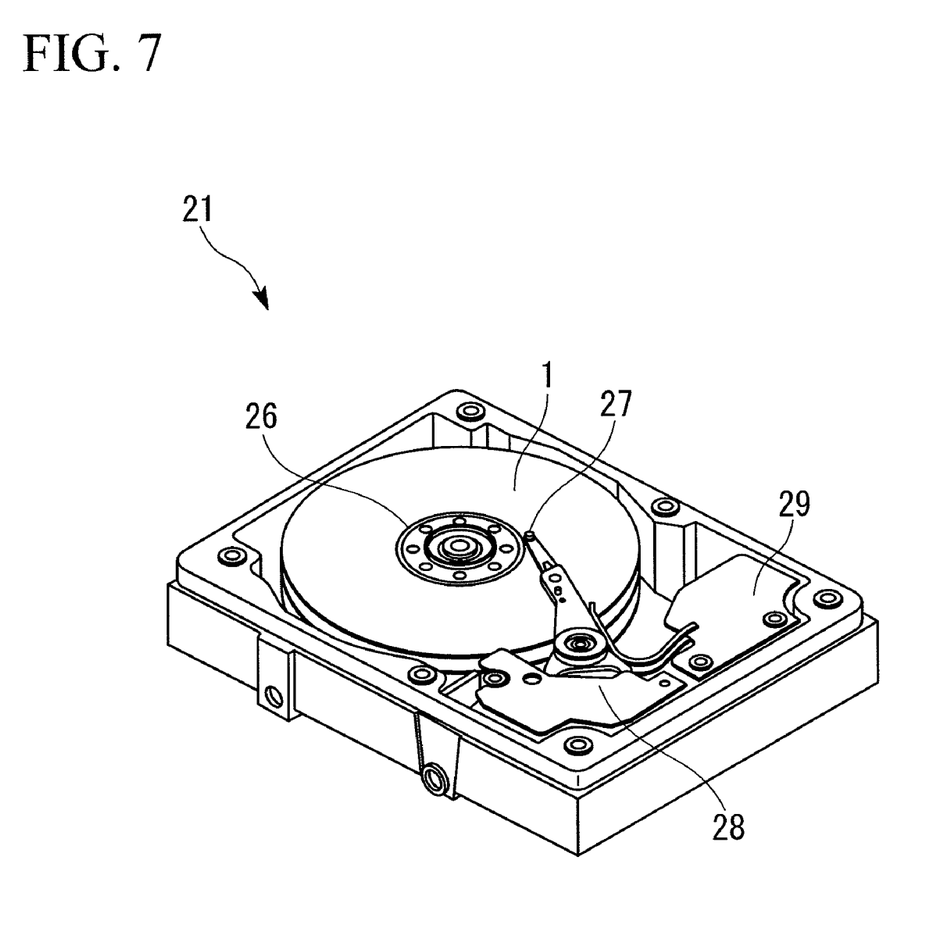
FIG. 7 is a diagram schematically illustrating an example of the structure of a magnetic recording/reproducing apparatus according to the present invention.

Next, a magnetic recording/reproducing apparatus including the magnetic recording medium 1 shown in FIGS. 1, 2A, and 2B will be described as an example of a magnetic recording/reproducing apparatus according to the present invention. FIG. 7 is a diagram schematically illustrating an example of the structure of the magnetic recording/reproducing apparatus according to the present invention. A magnetic recording/reproducing apparatus 21 shown in FIG. 7 includes the magnetic recording medium 1 shown in FIGS. 1, 2A, and 2B, a medium driving unit 26 that rotates the magnetic recording medium 1 in a circumferential direction (in a recording track direction), the magnetic head 27 including the read head and the write head shown in FIG. 2B, a head moving unit 28 that moves the magnetic head 27 relative to the magnetic recording medium 1, and a recording/reproducing signal processing unit 29 that inputs signals to the magnetic head 27 and reproduces the signals output from the magnetic head 27.

The recording/reproducing signal processing unit 29 processes data input from the outside to generate a recording signal and inputs the recording signal to the magnetic head 27. In addition, the recording/reproducing signal processing unit 29 processes a reproduction signal output from the magnetic head 27 to generate data and outputs the data to the outside.

A magnetic head that is suitable for high recording density and includes, for example, an anisotropic magnetoresistive (AMR) element using an AMR effect, a giant magnetoresistive (GMR) element using a GMR effect, or a tunneling magnetoresistive (TuMR) element using a TuMR effect as a reproducing element for a read head may be used as the magnetic head 27.

The magnetic recording/reproducing apparatus 21 shown in FIG. 7 includes the magnetic recording medium 1 with good write characteristics. Therefore, even when the magnetic head 27 is used which has a weak write magnetic field corresponding to high recording density, it is possible to reliably write information on the magnetic recording patterns 2 and thus obtain good write characteristics.

In the magnetic recording/reproducing apparatus 21 shown in FIG. 7, the magnetic recording medium 1 is hardly affected by adjacent magnetic recording patterns 2 during the read operation. Therefore, it is possible to obtain a sufficient reproduction output and a high SNR using the magnetic head 27 including the read head 11 with a width equal to or less than that of the write head 12.

EXAMPLES

Next, the present invention will be described in detail with reference to examples.

Examples

A magnetic recording medium according to an example was obtained by the following manufacturing method.

First, as a non-magnetic substrate, a glass substrate for a hard disk was prepared which was made of crystallized glass having $Li_2Si_2O_5$, $Al_2O_3$—$K_2O$, $Al_2O_3$—$K_2O$, $MgO$—$P_2O_5$, or $Sb_2O_3$—$ZnO$ as a constituent component and had an outside diameter of 65 mm, an inside diameter of 20 mm, and an average surface roughness (Ra) of 2 Å (0.2 nm).

Then, the non-magnetic substrate was placed in a vacuum chamber of a film forming apparatus, and the internal pressure of the vacuum chamber was reduced to $1.0 \times 10^{-5}$ Pa or less. Then, a FeCoB film serving as a soft magnetic layer, a Ru film serving as an intermediate layer, and a 25Fe-30Co-45Pt film serving as a magnetic layer were sequentially formed on the non-magnetic substrate by a DC sputtering method. The thickness of the soft magnetic layer was 600 Å, the thickness of the intermediate layer was 100 Å, and the thickness of the magnetic layer was 150 Å.

Then, a resist composed of an ultraviolet curable resin was coated with a thickness of 60 nm on the entire surface of the magnetic layer to form a resist film. Then, a Ni stamper prepared in advance came into close contact with the surface of the resist film and was then pressed to imprint an uneven pattern of the stamper on the surface of the resist film. Grooves with a depth of 30 nm and a width of 70 nm were formed at a track pitch and a bit pitch of 100 nm in the stamper. Then, ultraviolet rays were radiated onto the resist film to harden the resist film into a resist layer, and concave portions of the resist layer were removed by dry etching to expose the surface of the magnetic layer, thereby forming a resist pattern. Dry etching was performed on the resist layer under the conditions of an $O_2$ gas flow rate of 40 sccm, a pressure of 0.3 Pa, a high-frequency plasma power of 300 W, a DC bias of 30 W, and an etching time of 15 seconds.

Then, a coercivity reducing process was performed on a region of the magnetic layer exposed from the resist pattern. A reactive plasma process was performed as the coercivity reducing process to form the high-coercivity region having an inverted trapezoidal shape in a vertical cross-sectional view in which the width thereof was gradually reduced in the depth direction from the surface. An inductively coupled plasma apparatus manufactured by ULVAC, Inc. was used for the reactive plasma process. In addition, plasma was generated under the conditions of a $CF_4$ gas flow rate of 90 cc/minute, a power of 200 W, an internal pressure of 0.5 Pa, and a process time of 45 seconds.

Then, an ion implantation process was performed as a separation process that reduced the coercivity of a region of the magnetic layer that was not covered with the resist pattern so as to magnetically separate the magnetic recording patterns. The ion implantation process was performed under the conditions of an acceleration voltage of 1000 V, a current density of 0.4 mA/cm$^2$, and a process time of 30 seconds, in a mixed gas atmosphere of a He gas and a Ne gas (a ratio of 50:50).

Then, the resist pattern was removed from the surface of the magnetic layer by dry etching. Then, a protective layer that was made of carbon and had an average thickness of 40 Å was formed on the magnetic layer by a plasma CVD method, and a fluorine-based lubricant was coated on the protective layer to form a lubrication film. A magnetic recording medium according to the example was manufactured by the above-mentioned steps.

The electromagnetic conversion characteristics (SNR and 3T-squash) of the manufactured magnetic recording medium according to the example were measured. The electromagnetic conversion characteristics were evaluated by using a spin stand. For the heads for evaluation, a perpendicular recording head was used as a recording head and a TuMR head (a tunneling magneto resistive head manufactured by TDK Corporation) was used as a read head to measure an SNR value and 3T-squash when a signal was recorded at a recording density of 750 kFCI.

The measurement results proved that, in the magnetic recording medium according to the example, the magnetic recording pattern included a low-coercivity region with a coercivity of 500 (Oe) and a high-coercivity region with a coercivity of 4500 (Oe) and the high-coercivity region was arranged at the center of the low-coercivity region. In addition, the measurement results proved that regions other than the region in which the magnetic recording pattern was provided in the magnetic layer were non-magnetic, the SNR was 13.9 dB, and the 3T-squash (fringe) was 97%. As a result, good recording/reproducing characteristics were obtained. Here, the term '3T-squash' (3-track squash) means the ratio (%) of the signal intensities of the center track before and after signals are recorded on both sides of the center after signals have been recorded on the center track.

Comparative Example

Figure 8:
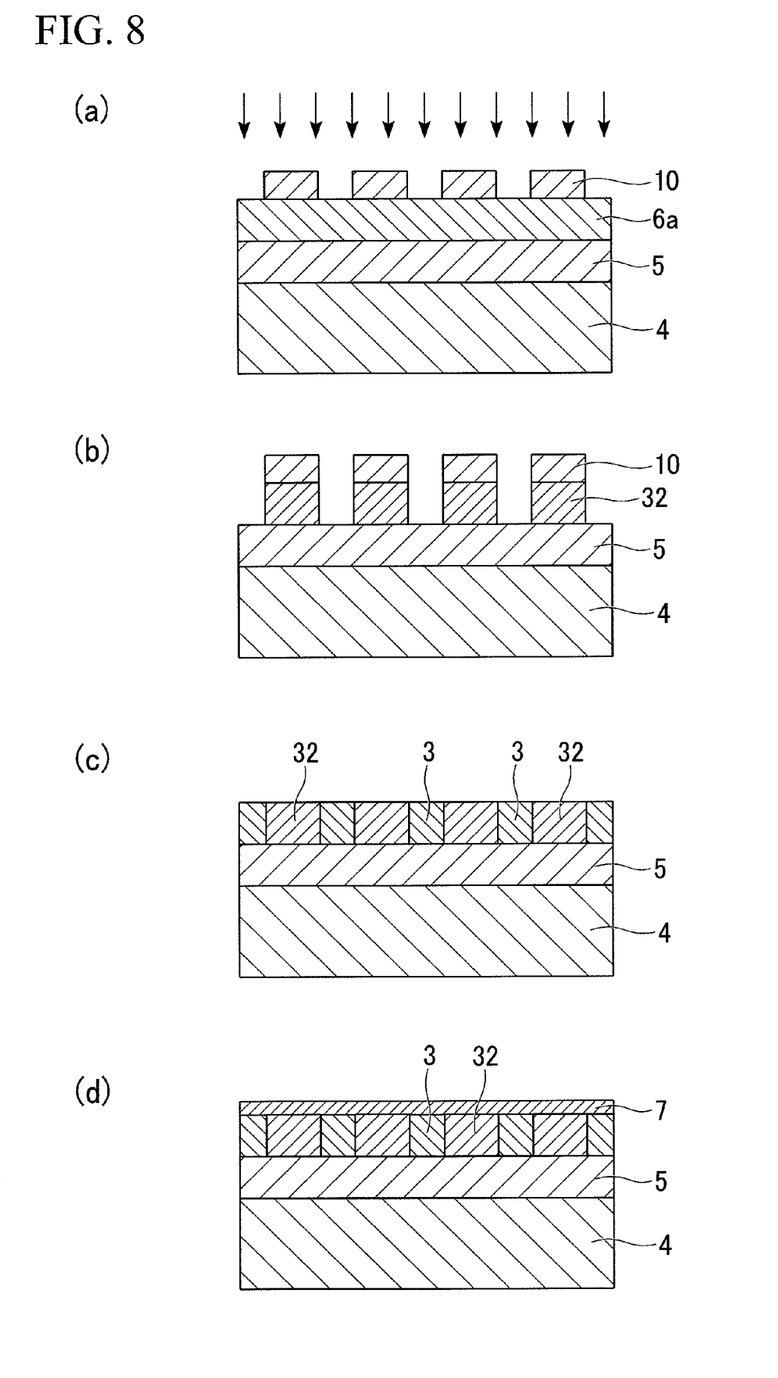
FIG. 8 is an enlarged cross-sectional view illustrating a magnetic recording medium according to a comparative example.

A magnetic recording medium according to a comparative example of the present invention was obtained by a manufacturing method shown in FIG. 8.

A soft magnetic layer 5, an intermediate layer, and a magnetic layer 6a were sequentially formed on the same non-magnetic substrate 4 as that in the magnetic recording medium according to the example by the same method as that in the magnetic recording medium according to the example. Then, as shown in FIG. 8(*a*), a resist pattern 10 was formed by the same method as that in the magnetic recording medium according to the example. Then, as shown in FIG. 8(*b*), the magnetic layer 6a exposed from the resist pattern 10 was removed by, for example, dry etching using Ar to form a magnetic recording pattern 32.

Then, the resist pattern 10 was removed by dry etching, and a non-magnetic material composed of C was formed by a CVD method. Then, the surface of the non-magnetic material was etched by dry etching to form inter-magnetic-recording-pattern regions 3 shown in FIG. 8(*c*). Then, a protective layer 7 and a lubrication layer were sequentially formed by the same method as that in the magnetic recording medium according to the example. The magnetic recording medium according to the comparative example shown in FIG. 8(*d*) was manufactured by the above-mentioned steps.

The electromagnetic conversion characteristics (SNR and 3T-squash) of the manufactured magnetic recording medium according to the comparative example were measured by the same method as that in the magnetic recording medium according to the example.

The measurement results proved that, in the magnetic recording medium according to the comparative example, the magnetic recording pattern had a constant coercivity of 4500 (Oe), regions other than the region in which the magnetic recording pattern was provided in the magnetic layer were non-magnetic, the SNR was 13.1 dB, and the 3T-squash was 92%. As can be seen from the measurement result, the recording/reproducing characteristics of the magnetic recording medium according to the example are better than those of the magnetic recording medium according to the comparative example.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A magnetic recording medium comprising:
   a plurality of magnetic recording patterns that are magnetically separated from each other,
   wherein each of the magnetic recording patterns includes a low-coercivity region and a high-coercivity region having a coercivity higher than the low-coercivity region,
   the high-coercivity region is arranged at the center of the low-coercivity region in a plan view, and
   the high-coercivity region has an inverted trapezoidal shape in a vertical cross-sectional view in which the width thereof is gradually reduced from the surface in the depth direction.

2. The magnetic recording medium according to claim 1, wherein the coercivity of the high-coercivity region is in the range of 2000 (Oe) to 6000 (Oe), and
   the coercivity of the low-coercivity region is in the range of 100 (Oe) to 1000 (Oe).

3. The magnetic recording medium according to claim 2, wherein the magnetic recording pattern is at least one of a recording track, a recording bit, and a servo signal.

4. A magnetic recording/reproducing apparatus comprising:
   the magnetic recording medium according to claim 2;
   a medium driving unit that drives the magnetic recording medium in a recording track direction;
   a magnetic head that includes a recording unit and a reproducing unit;
   a head moving unit that moves the magnetic head relative to the magnetic recording medium; and
   a recording/reproducing signal processing unit that inputs signals to the magnetic head and reproduces signals output from the magnetic head.

5. The magnetic recording medium according to claim 1, wherein the magnetic recording pattern is at least one of a recording track, a recording bit, and a servo signal.

6. A magnetic recording/reproducing apparatus comprising:
   the magnetic recording medium according to claim 1;
   a medium driving unit that drives the magnetic recording medium in a recording track direction;
   a magnetic head that includes a recording unit and a reproducing unit;
   a head moving unit that moves the magnetic head relative to the magnetic recording medium; and
   a recording/reproducing signal processing unit that inputs signals to the magnetic head and reproduces signals output from the magnetic head.

* * * * *